United States Patent [19]

Jenkins et al.

[11] Patent Number: 4,938,650

[45] Date of Patent: Jul. 3, 1990

[54] SPREADING APPARATUS FOR ATTACHMENT TO TRACTORS

[75] Inventors: David W. Jenkins, Godalming; Philip Threadgold, bookham, both of United Kingdom

[73] Assignee: Charterhouse Turf Machinery Limited, Guildford, England

[21] Appl. No.: 302,601

[22] Filed: Jan. 19, 1989

[30] Foreign Application Priority Data

Apr. 8, 1988 [GB] United Kingdom ................. 8808234

[51] Int. Cl.⁵ ................................................ B60P 1/46
[52] U.S. Cl. ................................... 414/469; 37/117.5; 222/165; 222/414; 414/722
[58] Field of Search ................ 414/468, 469, 472, 476, 414/481, 483, 485–487, 501, 551; 222/165, 414; 37/117.5

[56] References Cited

U.S. PATENT DOCUMENTS

| 213,373 | 3/1879 | Anderson | 222/414 |
| 2,539,253 | 1/1951 | Jorgensen | 222/414 |
| 2,692,705 | 10/1954 | Marihart | 222/414 |
| 3,065,556 | 11/1962 | Kampert | 222/165 |
| 3,128,015 | 4/1964 | Wallis | 222/414 |
| 3,172,574 | 3/1965 | Hiler et al. | 222/414 |
| 3,275,199 | 9/1966 | Thomsen | 222/414 |
| 3,620,423 | 11/1971 | Dolgleish | 222/414 |
| 3,788,529 | 1/1974 | Christy | 222/414 |
| 3,912,092 | 10/1975 | Bolton et al. | 414/486 |
| 4,657,431 | 4/1987 | Morrison | 222/414 |

FOREIGN PATENT DOCUMENTS 3408055 9/1985 Fed. Rep. of Germany ...... 222/165

Primary Examiner—David H. Brown
Attorney, Agent, or Firm—Beveridge, DeGrandi & Weilacher

[57] ABSTRACT

Spreading apparatus for use with a tractor, comprising frame means for attachment to the three-point-linkage of a tractor, a hopper mounted on the frame means, the hopper having means for allowing a substance, contained within the hopper, to be spread onto the ground; and means for moving the hopper relative to the frame to allow the hopper to rotate from a spreading position in which the hopper is in a substantially upright position to a loading position in which the hopper is in a substantially horizontal position whereby the hopper may be used as a shovel to allow the substance to be spread over the ground to be loaded into the hopper, means being provided to effect movement of the hopper between positions.

10 Claims, 5 Drawing Sheets 4,938,650

SPREADING APPARATUS FOR ATTACHMENT TO TRACTORS

BACKGROUND OF THE INVENTION

This invention relates to spreading apparatus for attachment to tractors and Particularly but not exclusively spreading apparatus for use in the spreading of sand or other substances for use in ground management.

BRIEF DESCRIPTION OF THE INVENTION

The spreading of sand and other such substances in the top dressing of grounds is a job which requires not only considerable physical effort but also is one which is labour intensive. It is therefore an object of the present invention to provide apparatus which reduces the amount of physical effort and also the number of people required in carrying out this sort of job.

This and other objects of the present invention are met in spreading apparatus for use with a tractor, comprising frame means for attachment to the three-point-linkage of a tractor, a hopper mounted on the frame means, the hopper having means for allowing a substance, contained within the hopper, to be spread onto the ground; and means for moving the hopper relative to the frame to allow the hopper to rotate from a spreading position in which the hopper is in a substantially upright position to a loading position in which the hopper is in a substantially horizontal position whereby the hopper may be used as a shovel to allow the substance to be spread over the ground to be loaded into the hopper, means being provided to effect movement of the hopper between positions.

DESCRIPTION OF THE SPECIFIC EMBODIMENTS

Figure 1:
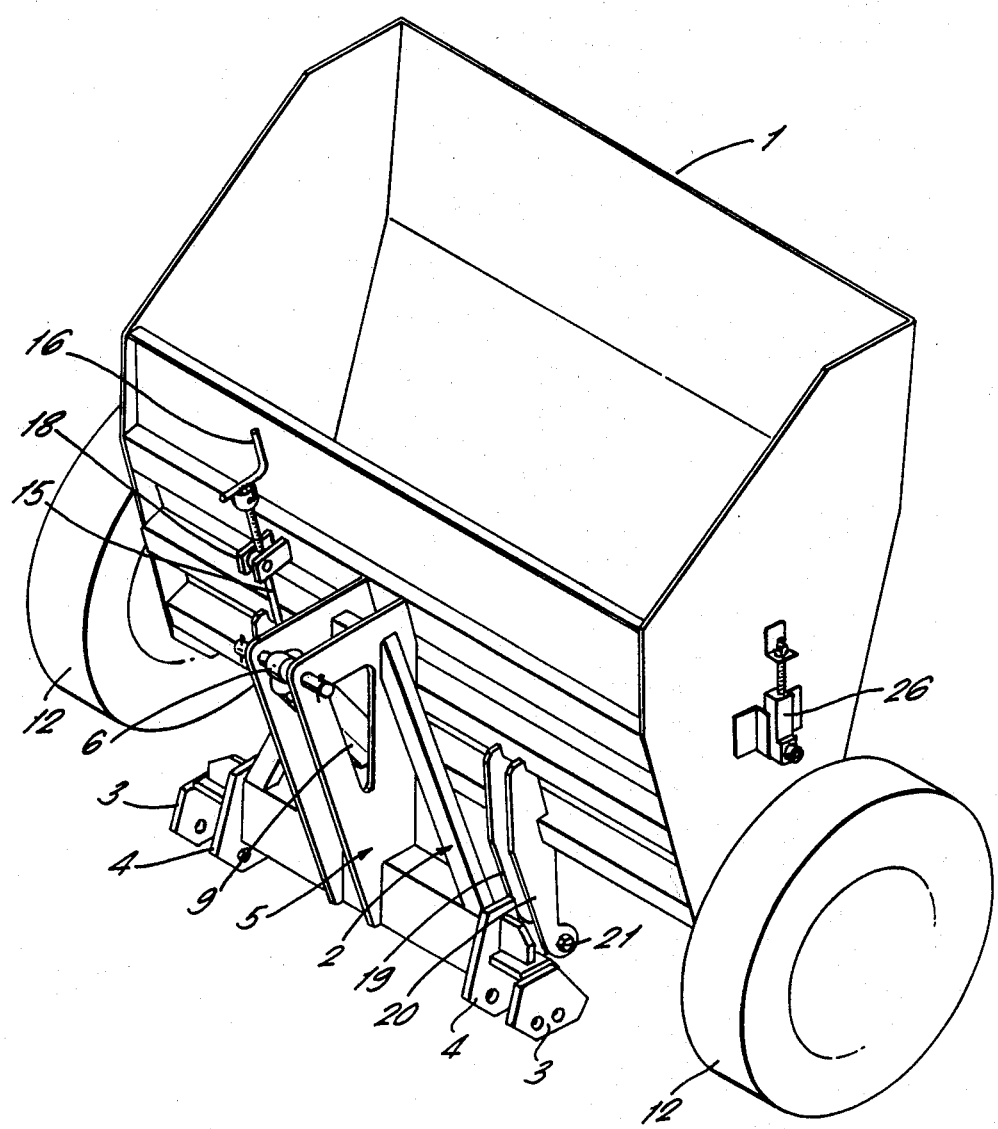
FIG. 1 is a perspective view of the spreading apparatus according to the invention.
Figure 2:
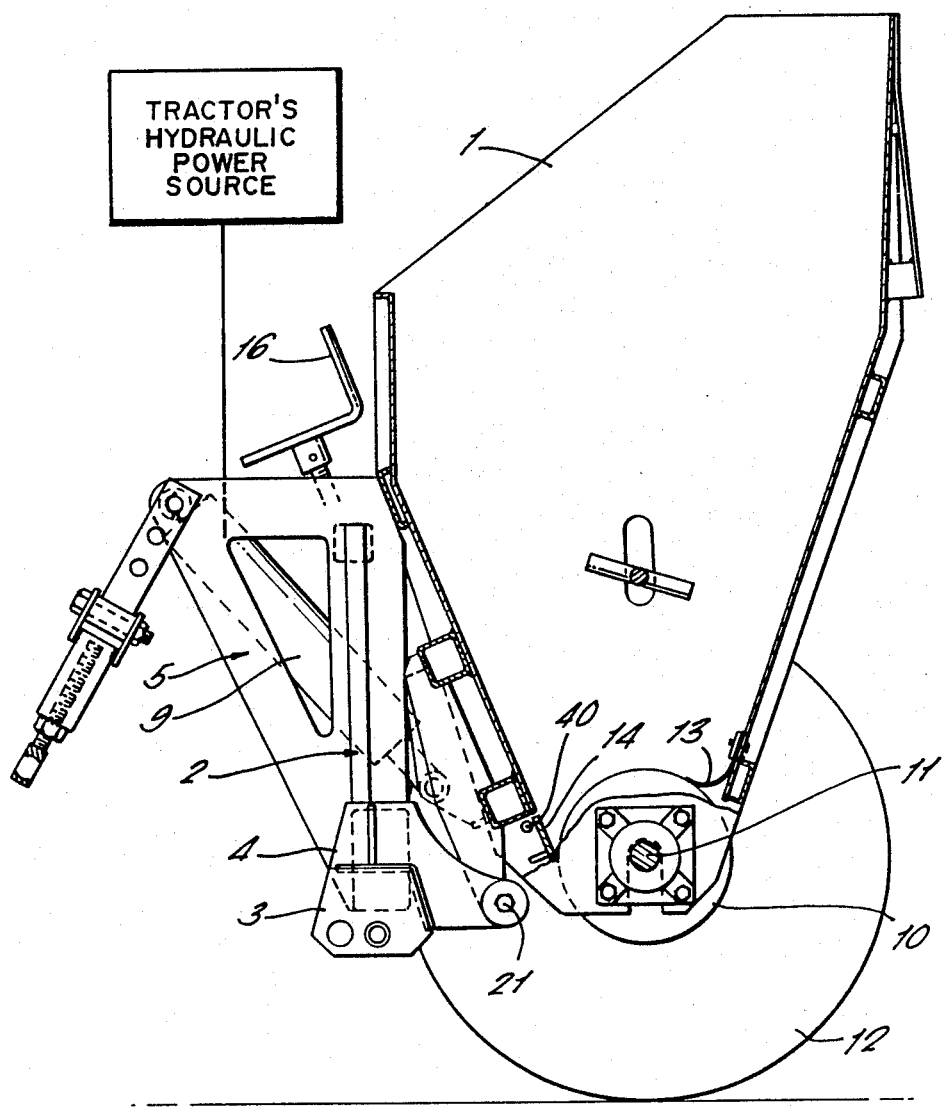
FIG. 2 is a vertical cross-section of the spreading apparatus.

The spreading apparatus as shown in FIG. 1 has a hopper (1) which is open at the top. The hopper (1) is attached to the three-point-linkage of a tractor by attachment means comprising an A-frame (2) made of rectangular-section metal tubes welded together, the lower cross tube of the A-frame having forwardly directed flanges (3,4) on each end, for attachment to the lower two points of the three-point-linkage of the tractor. The A-frame (2) also has a mounting bracket comprising right-angular frame (5) projecting centrally and forwardly of the A-frame. The furthermost corner of the right-angular frame (5) from the A-frame, which is at the same height as the apex of the A-frame (2), has a top pin (6) for attachment to the upper point of the three-point-linkage of the tractor. The right-angular frame (5) is made of two parallel (7, 8) plates (see FIG. 3) spaced apart and a hydraulic piston arrangement (9) projects between the two plates (7, 8) and is connected at one end to the upper point of the three-point-linkage of the tractor and at the opposite end, to the hopper (1) above the lower cross tube of the A-frame (2). The hydraulic piston arrangement (9) is attached to the hydraulic system of the tractor in the conventional manner.

The hopper (1) has an aperture in its base in which a roller (10) is situated. The roller (10) rotates about an axle (11) which has at each of its ends, wheels (12). The roller (10) has a raised patterned surface. A rubber strip (13) closes the gap which is formed between the roller (10) and the back wall of the hopper (1), so that when sand or another substance is put into the hopper the weight of the sand forces the rubber strip (13) downwards and outwards against the roller (10) and the hopper wall so forming a seal so that the sand does not escape through the gap.

A similar gap exists between the roller (10) and the front wall of the hopper (1) but instead of a rubber strip, there is controlling means in the form of a gate (14) rotatable about a pivot (40) to control the gap between the roller (10) and the hopper wall.

Figure 5:
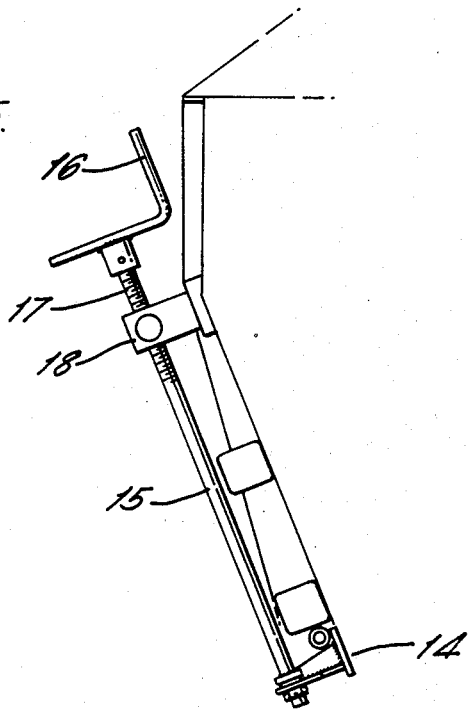
FIG. 5 is a more detailed view of the controlling means of FIG. 1.

Referring now to FIG. 5, the gate (14) is connected to a shaft (15), the shaft (15) having at its opposite end a handle (16). The shaft (16) also has threads (17) on its surface, near the handle (16), which co-operate with threads on the inside of a support (18). To operate the gate (14), the handle (16) is rotated manually which causes the shaft (15) to rotate and the co-operating action of the threads (17) with the threads in the support (18) causes the shaft (15) to move up or down so rotating the gate (14) depending upon the direction of rotation of the handle (16).

Figure 3:
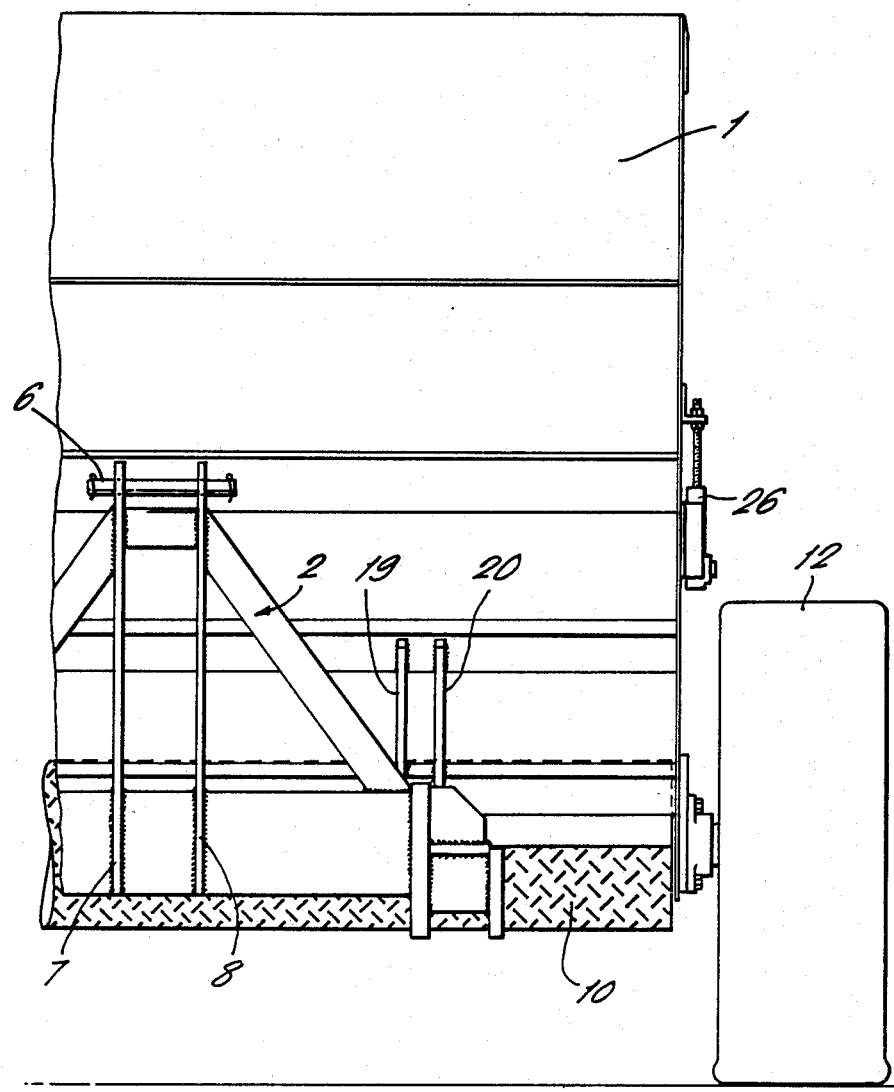
FIG. 3 is a partial lateral cross-section of the spreading apparatus.
Figure 4:
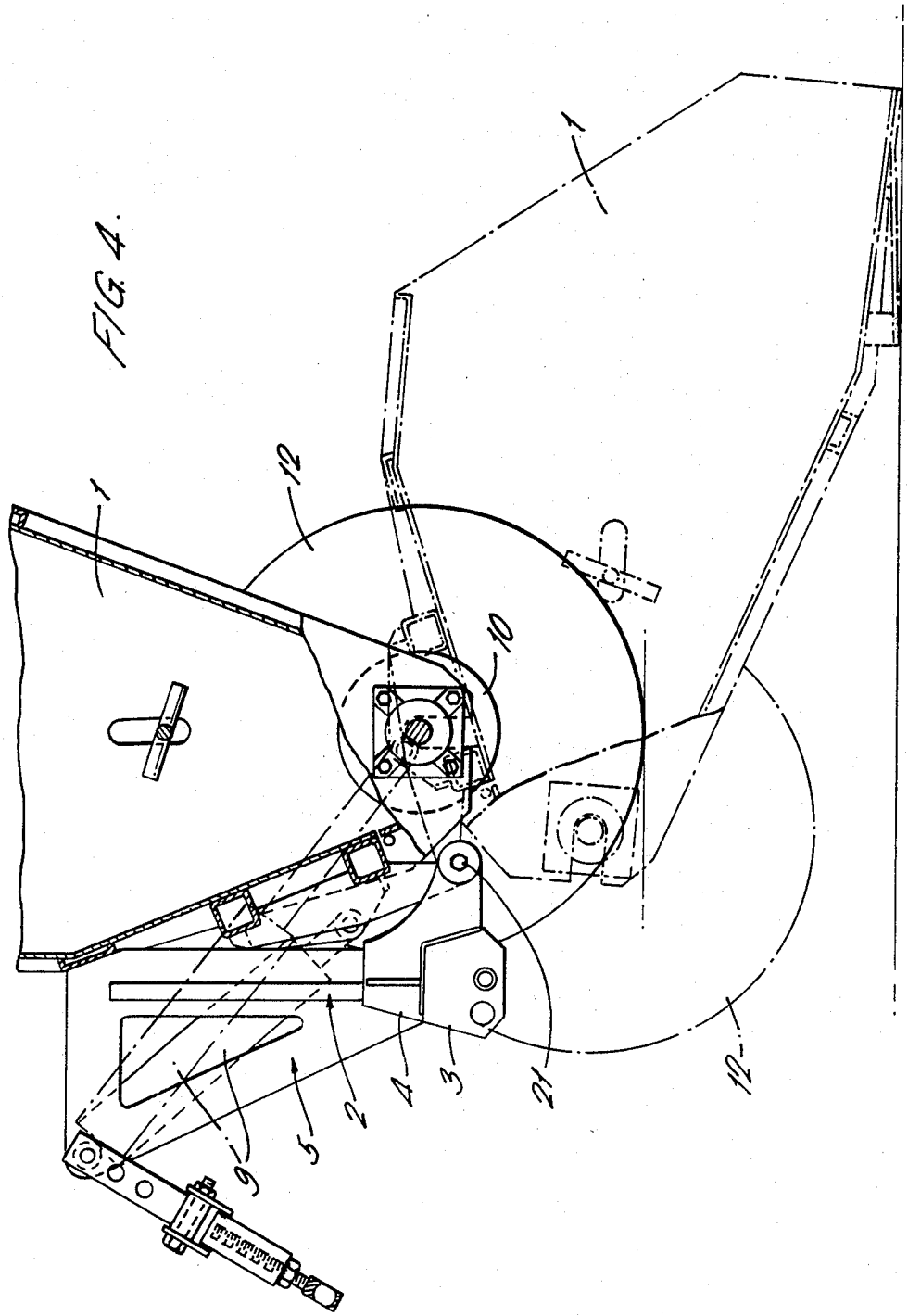
FIG. 4 shows the spreading apparatus in its different positions when in operation.

The hopper (1) is pivotally connected to the A-frame (2) at either side by plates (19, 20) as shown in FIG. 3 (only one set shown). Pivotal connections (21) are situated at the base of the hopper (1), forward of the front wall of the hopper (1) and allow the hopper (1) to pivot from a spreading position in which the hopper is substantially upright, to a loading position in which the hopper is substantially horizontal and vice versa. The hydraulic piston arrangement (9) is connected to the hopper (1) above the axis of rotation of the hopper (1) about the pivotal connections (21). By operation of the hydraulic piston arrangement (9) the hopper (1) may be moved from its spreading position to its loading position and back to its spreading position as shown in FIG. 4.

Figure 6:
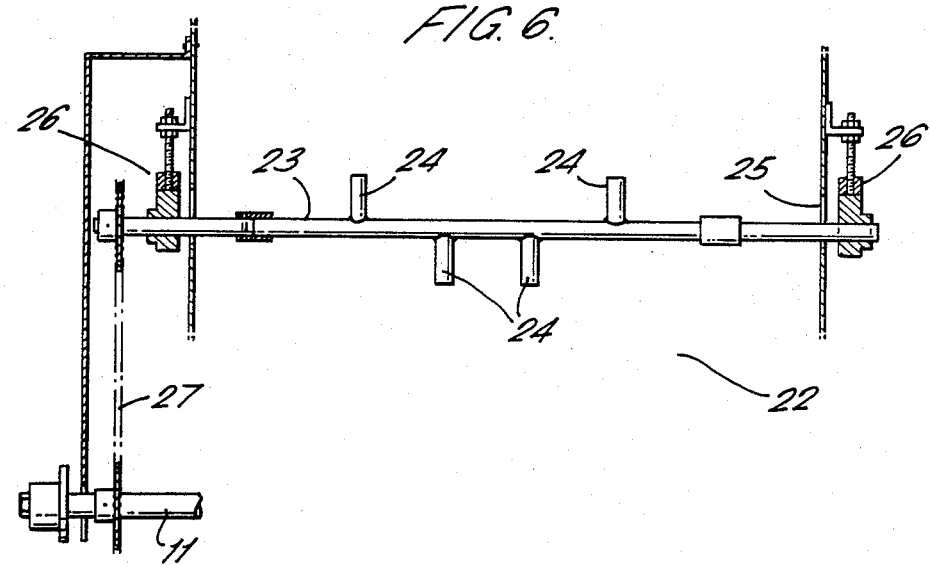
FIG. 6 is a more detailed view of the agitator of FIG. 3.

The spreading apparatus also has an agitator (22) situated centrally within the hopper and is shown separately in FIG. 6. The agitator (22) has a rotating shaft (23) with projections (24). The rotating shaft (23) projects at each end through upwardly directed slots (25) in the sides of the hopper (1) and is held, at each end, by supports (26) which are housed externally of the hopper (1). The rotating shaft (23) is directly driven via a chain (27) by the axle (11). The rotating shaft (23) may be raised or lowered in the hopper (1) by adjusting the supports (26).

When in operation the spreading apparatus is raised by the three-point-linkage of the tractor so that its wheels (12) are above the ground. The spreading apparatus is then rotated into its loading position when the hopper (1) is substantially horizontal by operation of the hydraulic piston arrangement (9). The spreading apparatus is then moved so that the hopper (1) touches the ground with the backward wall of the hopper lying on the ground. The tractor is then reversed so that the hopper (1) is pushed into a heap of sand or similar substance, so that the sand is shovelled into the hopper. The hopper (1) is then raised by operation of the hydraulic piston arrangement (9) until it is in its spreading position when the hopper (1) is substantially upright once more.

At the area which is to have top dressing, the spreading apparatus is lowered so that it may be drawn along by the tractor with its wheels (12) in contact with the ground. The hopper (1) is in its spreading position and the gate (14) is opened by a desired amount to allow the sand to fall through the gap formed, onto the ground. The gate (14) is opened by manually turning the handle (16) and control of the width of the gap formed by rotation of the gate (14) controls the amount of sand falling through the gap.

As the spreading apparatus is drawn along the ground, sand falls through the gap opened by the gate (14), by the action of the patterned roller (10). Also as the spreading apparatus is drawn along the ground the rotating axle (11) drives the agitator (22) which acts to stir the sand and prevent it from lumping together.

Although the spreading apparatus as described above uses a hydraulic piston arrangement for rotating the hopper from its spreading position to its scooping position any similar ram mechanism or other means for rotating the hopper may be used instead. Similarly any suitable means for spreading the sand or other substance from the hopper may be used and not necessarily the roller and gate mechanism.

We claim:

1. Spreading apparatus for use with a tractor having a hydraulic power source and a three-point-linkage, the spreading apparatus comprising: a rigid frame having attachment means for mounting said frame on the three-point-linkage of a tractor; a hopper movably mounted on said frame; spreading means contained in said hopper for spreading a substance contained in said hopper on the ground; a hydraulic ram connected to said frame and to said hopper and extending between said frame and hopper; and hydraulic connection means for connecting said hydraulic ram of said spreading apparatus operatively with the hydraulic power source of the tractor, said hydraulic ram moving said hopper relative to said frame so as to move said hopper relative to said frame from a spreading position, in which said hopper is in a substantially upright position, to a loading position, in which said hopper is in a substantially horizontal position, whereby said hopper may be used as a shovel to allow said substance to be spread to be loaded into said hopper.

2. Spreading apparatus as claimed in claim 1, wherein there is an agitator provided within the hopper.

3. Spreading apparatus as claimed in claim 2, wherein the agitator includes a rotating shaft with projections along its length.

4. Spreading apparatus as claimed in claim 1 wherein the spreading means includes; a horizontal roller situated in an aperture in the base of the hopper; and controlling means for controlling the amount of substance which falls between the roller and the aperture.

5. Spreading apparatus as claimed in claim 4, wherein the controlling means includes at least one gate and means to operate the gate to open or close the gap formed between the roller and the gate.

6. Spreading apparatus as claimed in claim 4, wherein the hopper and frame are mounted on wheels attached to the axle of the roller and operable to drive the roller.

7. Spreading apparatus according to claim 1 wherein said frame includes a transversely extending A-frame from which a longitudinally extending mounting bracket extends, and wherein said hydraulic ram is mounted on said frame via said mounting bracket.

8. Spreading apparatus according to claim 7 wherein feet of said A-frame and an apex portion of said mounting bracket are adapted to co-operate with the three-point-linkage of the tractor.

9. Spreading apparatus according to claim 8 wherein said mounting bracket includes a pair of generally parallel plate members, said hydraulic ram extending between said plate members and generally parallel to said plate members.

10. Spreading apparatus according to claim 9 wherein a connection pin extends through holes defined by said plate members and an eye formation provided at an end of said hydraulic ram, said connection pin connecting said frame to the three-point-linkage.

* * * * *